(12) United States Patent
Chick

(10) Patent No.: US 6,725,601 B2
(45) Date of Patent: Apr. 27, 2004

(54) VERTICAL ECOSYSTEM STRUCTURE

(76) Inventor: Nelson Hyde Chick, 1534 Jones, San Francisco, CA (US) 94102

( * ) Notice: Subject to any disclaimer, the term of this patent is extended or adjusted under 35 U.S.C. 154(b) by 0 days.

(21) Appl. No.: 09/777,187

(22) Filed: Feb. 5, 2001

(65) Prior Publication Data

US 2002/0104264 A1 Aug. 8, 2002

(51) Int. Cl.$^7$ .................................................. A01G 9/02
(52) U.S. Cl. ........................ 47/83; 47/82; 47/47; 47/39; 52/745.09
(58) Field of Search .................................. 47/83, 82, 47, 47/39, 66.5, 66.1, 65.9, 29.1, 29.3, 29.5, 32, 33, 86; 405/284, 286; 52/745.09

(56) References Cited

U.S. PATENT DOCUMENTS

| | | | |
|---|---|---|---|
| 2,279,735 A | * | 4/1942 | Gates |
| 2,514,536 A | * | 7/1950 | Burney |
| 3,466,823 A | | 9/1969 | Dowling |
| 3,722,169 A | | 3/1973 | Boehmig |
| 3,758,987 A | * | 9/1973 | Crane ........................ 47/38.1 |
| 4,074,538 A | * | 2/1978 | Janus ........................... 61/47 |
| 4,295,296 A | | 10/1981 | Kinghorn |
| 4,380,136 A | * | 4/1983 | Karpisek ....................... 47/83 |
| 4,557,634 A | * | 12/1985 | Vidal ......................... 405/286 |
| 4,665,647 A | | 5/1987 | Behrens et al. |
| 4,800,675 A | | 1/1989 | Feil et al. |
| 4,896,456 A | * | 1/1990 | Grant ........................... 47/67 |
| 5,004,376 A | * | 4/1991 | Vidal et al. ................. 405/284 |
| 5,216,863 A | | 6/1993 | Nessa |
| 5,257,476 A | | 11/1993 | Fukuzumi |
| 5,287,650 A | | 2/1994 | Moriguchi |
| 5,484,234 A | | 1/1996 | Worden |
| 5,579,603 A | | 12/1996 | Fukuzumi |
| 5,608,989 A | | 3/1997 | Behrens |
| 5,647,695 A | | 7/1997 | Hilfiker |
| 5,724,766 A | | 3/1998 | Behrens |
| 5,806,264 A | | 9/1998 | Boot |
| 5,836,126 A | | 11/1998 | Harkenrider |

FOREIGN PATENT DOCUMENTS

| | | | | |
|---|---|---|---|---|
| DE | 3218152 A1 | * | 12/1983 | ............ A01G/9/02 |
| DE | 3415911 A1 | * | 10/1985 | ............ A01G/9/02 |
| DE | 03447485 A1 | * | 7/1986 | ............ A01G/9/02 |
| DE | 3539460 A1 | * | 5/1987 | ............ A01G/9/02 |
| DE | 3816866 A1 | * | 11/1989 | ............ A01G/9/02 |
| DE | 3837212 A1 | * | 3/1990 | .......... A01G/27/00 |
| JP | 406292473 A | * | 10/1994 | .......... A01G/23/00 |

OTHER PUBLICATIONS

Vinayak Bharne, Bungle in Jungle Winter 2000,2001 Veban Ecoligy 23–26.

(List continued on next page.)

*Primary Examiner*—Peter M. Poon
*Assistant Examiner*—Andrea M. Valenti

(57) ABSTRACT

A main structure that can be constructed using either solid steel assembly (32) or reinforced concrete assembly (33) acts as the main structural component for new and remodel construction. The main structure whether it uses reinforced concrete assembly (33) or steel assembly is comprised of cells of equilateral size and each cell has a passage between inner and outer wall created using this method of construction. The inner wall uses the passages to secure accompanying structures and systems to a wall that use this structural system. The outer wall uses the passages to secure retaining assembly (34) to the structure. Retaining assembly (34) holds a strata of soil to the wall and creates plateaus along face of outer wall. The plateaus created by securing retaining assembly (34) to main assembly's (32) or (33) give vegetation a place to be planted and secured to a wall that incorporate the construction method of this invention. The passages between the inner and outer walls also nurture the vegetation attached to a structure built using this invention's method of construction by allowing direct access to the roots. By allowing direct access to the roots of the vegetation planted on a structure utilizing the construction method of this invention each plant can receive the optimum amount of irrigation, drainage, and fertilizer.

10 Claims, 9 Drawing Sheets

OTHER PUBLICATIONS

Ian McLean, Breathing Wall, It's News Sep. 1995 Vol 1 No 4, 36–37.
Mia Schmiedsskamp, Poluting Purging Pnzams Scientific America Dec. 1997, 46.
Willian Bryant Logan, Climbing the Walls Garden Design, Feb.–Mar. 1995, 37, 38, 39.
Jane Holtz Kay, The Greening of Architecture, Architecture, May 91, 61, 62, 63.
Edward Gunts, Nature's Revenge Architecture, May 91, 73, 74, 75.
No Author Below. Business Week Architectural Awards, Architectural Record, Oct. 2000, 94–95.

* cited by examiner

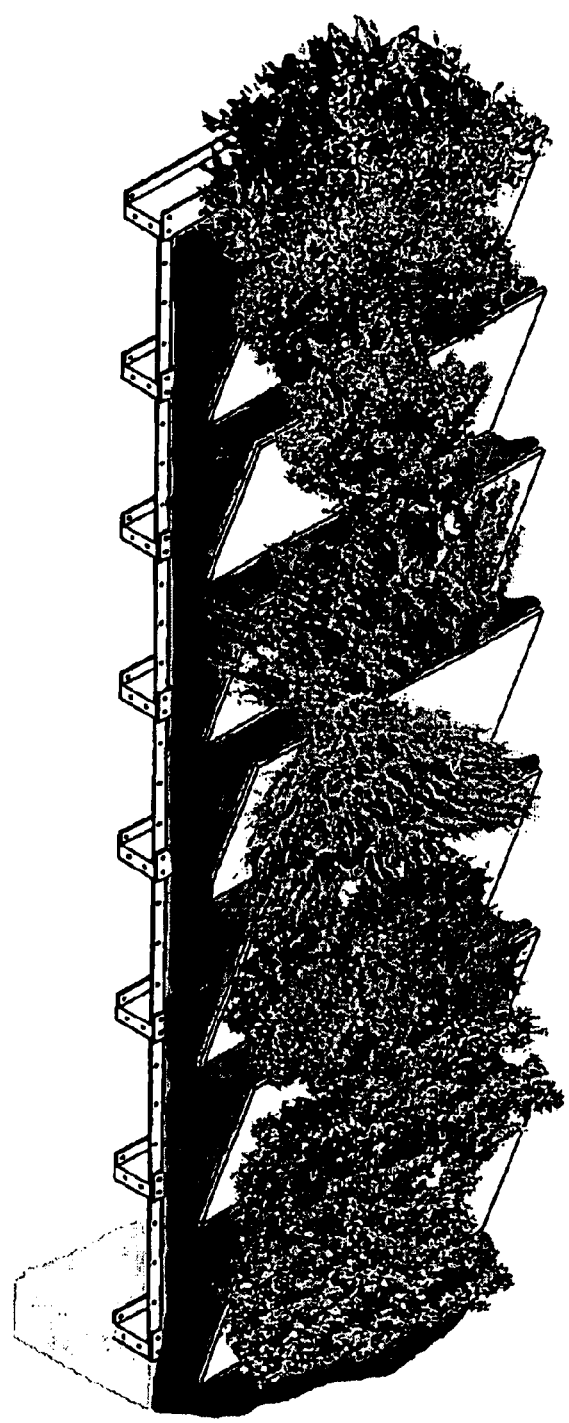
Figure #1

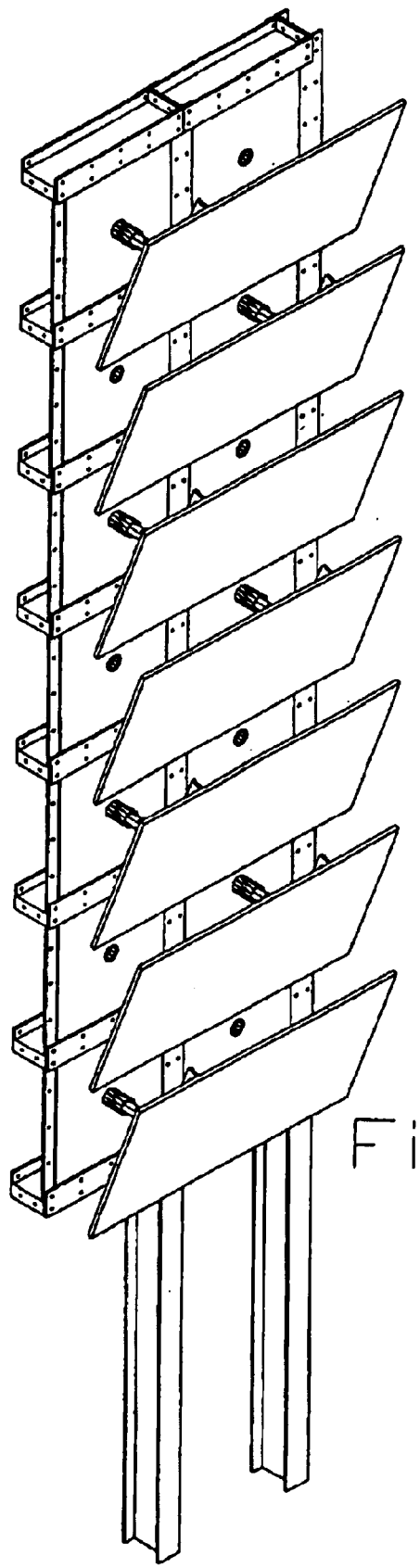
Figure #2

Figure #3
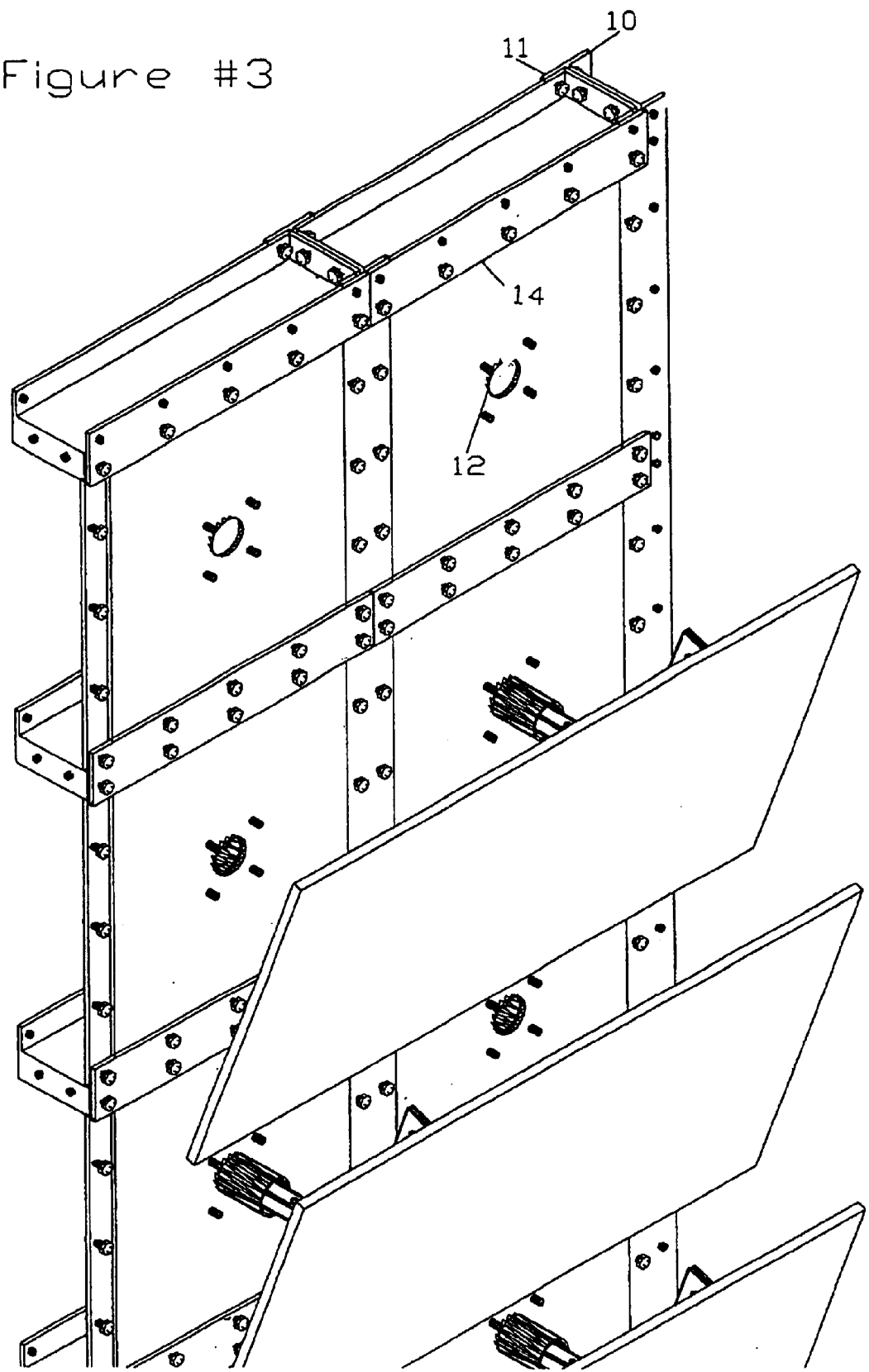

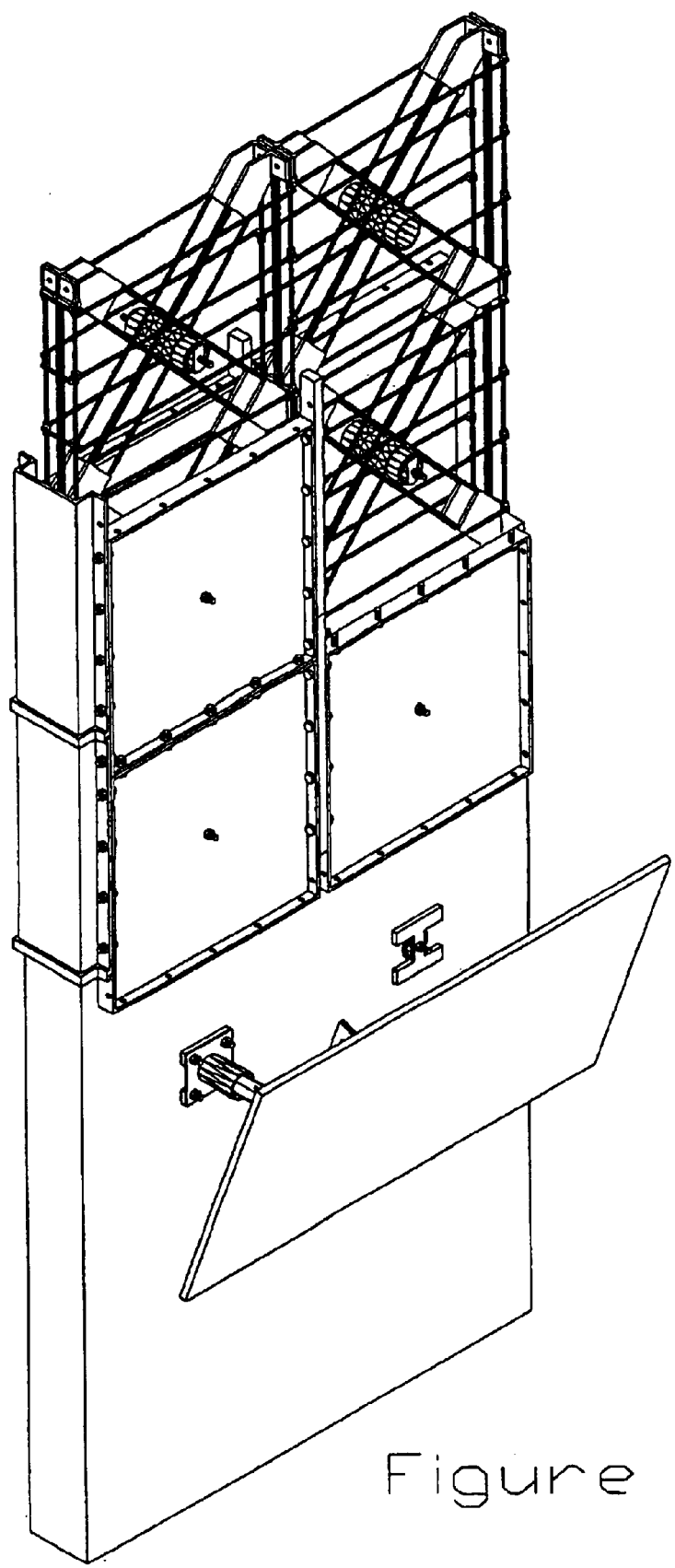
Figure #4

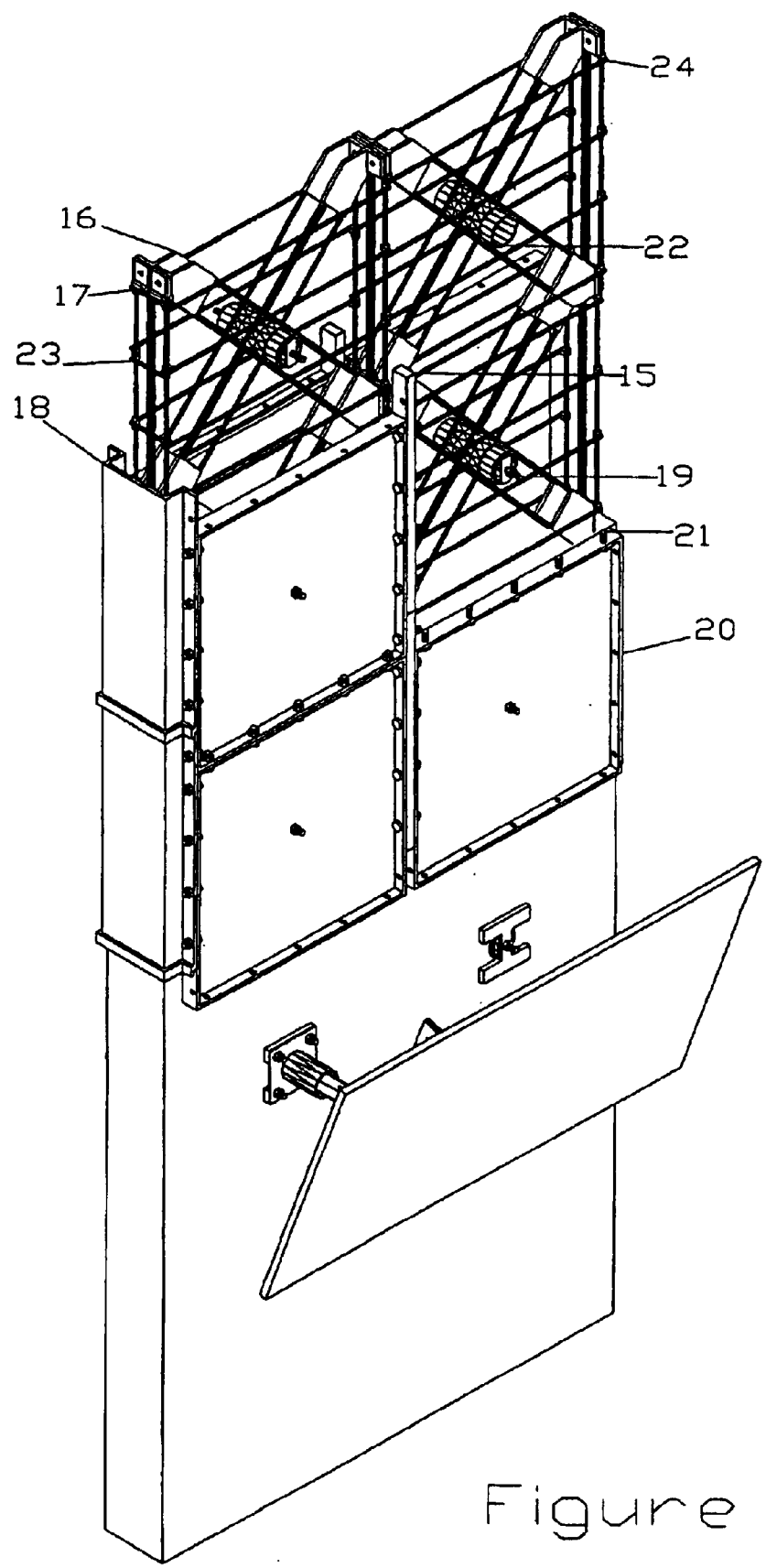
Figure #5

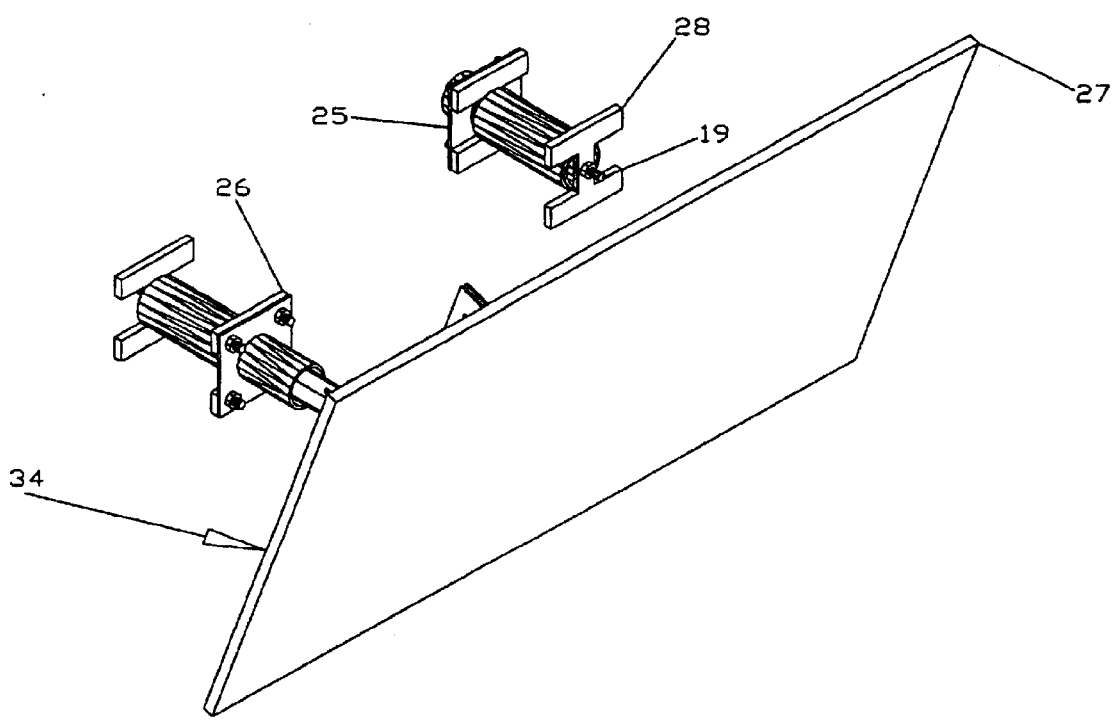
Figure #6

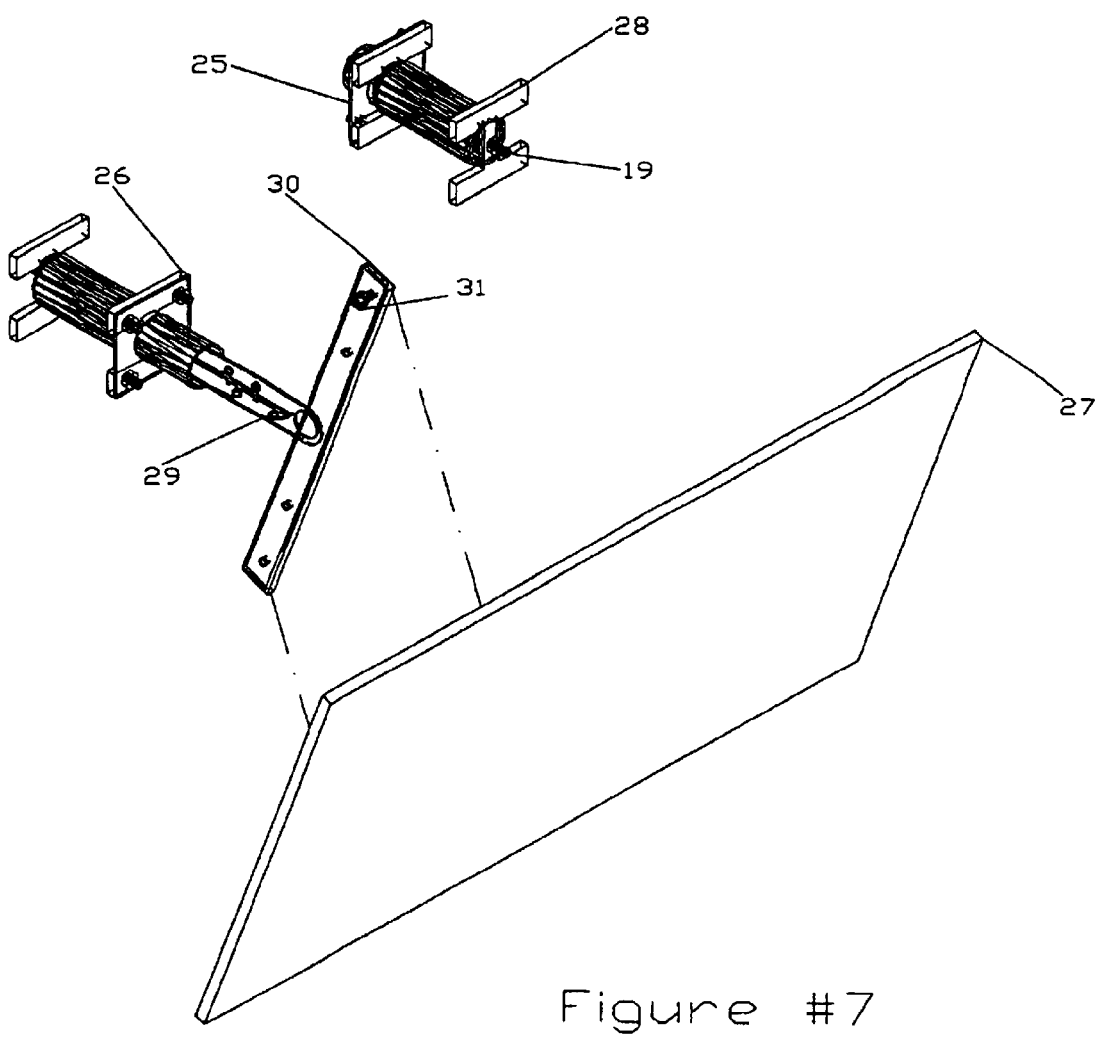
Figure #7

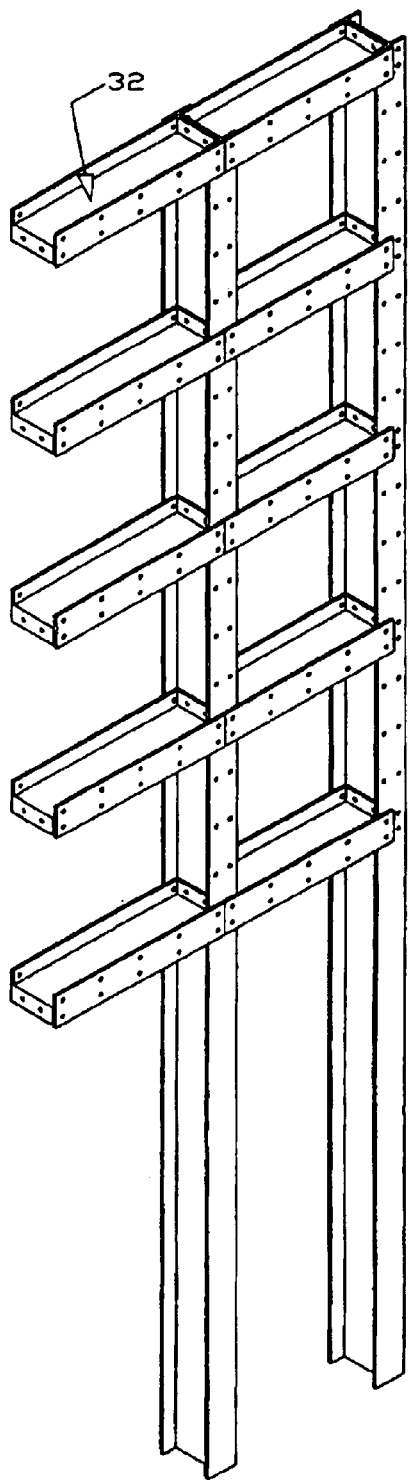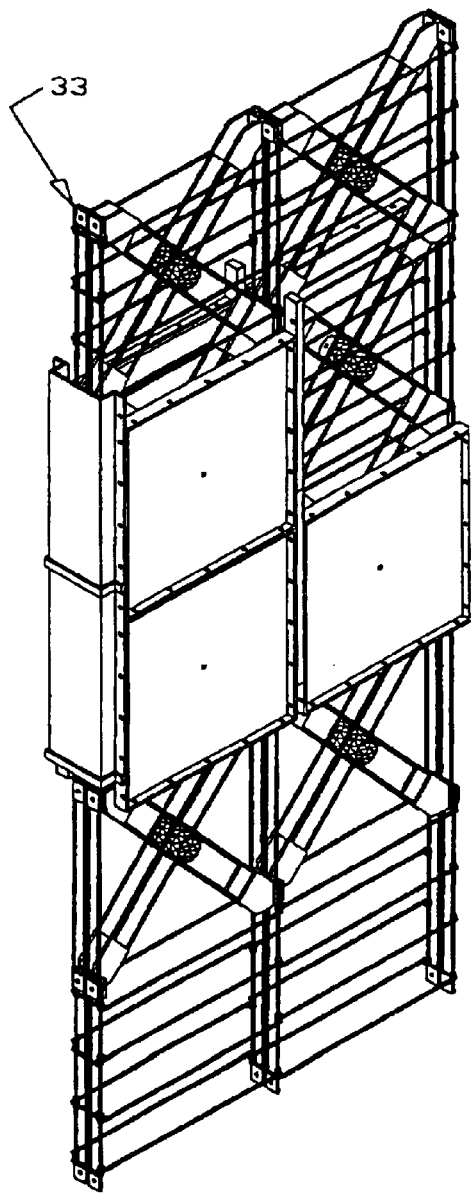
Figure #8A
Figure #8B

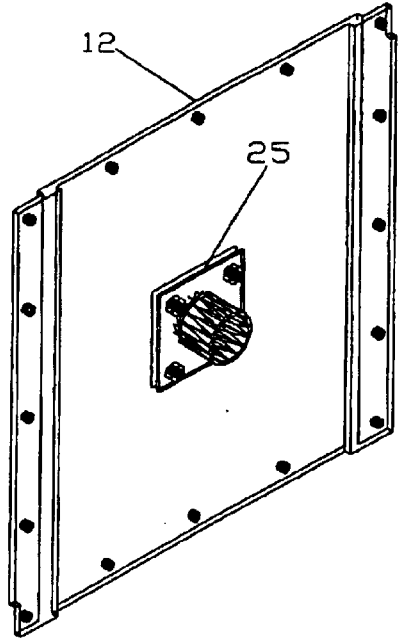
Figure #9A
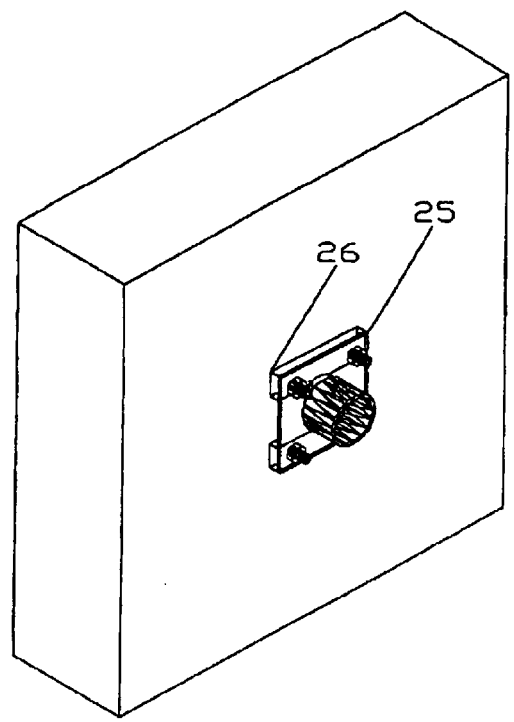
Figure #9B
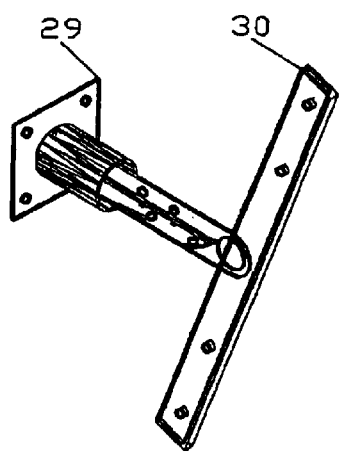
Figure #9C
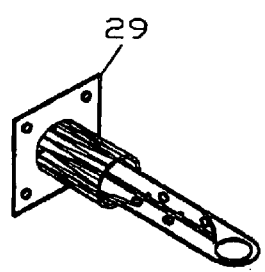
Figure #9D

VERTICAL ECOSYSTEM STRUCTURE

BACKGROUND

1. Field of Invention

The present invention relates to the field of construction, and more particularly to the erection of walls that withstand vertical and horizontal loads. The present invention also relates to environmental protection by incorporating nature as an integrated component of man made structures.

2. Prior Art

Most urban centers are located on prime arable land. Due to the rapid urbanization of the $20^{th}$ century, there has been a substantial loss of these fertile lands, and there are three factors mentioned below that may slow down the deterioration process of these arable lands.

Vegetation created on these arable lands converts carbon dioxide to oxygen. An increase in vegetation in an urban setting can reduce the amount of greenhouse gases which could help reduce global warming.

Vegetation filters air pollutants.

An increase of vegetation in an urban setting gives the psychological benefit to urban inhabitants of having access to nature filled environments.

As mankind's population continues to expand there will be a demand for low cost construction. One means to accomplish this would be to build modular main structural walls and then build a structure around the said wall. These walls will be utilized in many types of construction. These structural walls can be assembled from manufactured rigid components or a modular mold system can be used to cast these walls from concrete or concrete like material. The cast walls can be cast at a construction site or components can be cast in a factory and assembled at a construction site.

The challenge for builders will be to build structures that are inexpensive to build and can prevent the loss of arable land in urban settings.

One device for the incorporation of vegetation and man made structures is the use of rooftop gardens. U.S. Pat. Nos. 5,724,766; 5,608,789 and 5,287,650 are examples where a layer of vegetation is installed on flat roofs. One disadvantage to these devices is the added expense of building a roof that can sustain the added weight of the vegetation and the means of sustaining that vegetation. Another disadvantage is the added maintenance of having to re-roof these roofs more often than a conventional roof. U.S. Pat. No. 4,800,675 is another method of incorporating vegetation on rooftops. A disadvantage to this patent is the limitation on how large the root ball of the vegetation can be which limits the growth to the vegetation. All four mentioned patents have the disadvantage of being able to use only a limited number of vegetation species.

Another means to incorporate vegetation into man made structures is the use of vegetation friendly retaining walls. These walls have either planters and/or access to the soil behind the structure in the hillside that the wall is retaining. Retaining walls of a modular design which U.S. Pat. No. 5,484,234 is an example can reduce the cost of building retaining walls. Building retaining walls of this type do an excellent job of incorporating vegetation into man made structures. Unfortunately retaining walls are not freestanding and cannot be used as a structural component for a freestanding structure. This limits its utility, to only structures that retain hillsides.

There are freestanding structures that incorporate vegetation. Examples of this type of structure are U.S. Pat. Nos. 5,647,695 and 4,665,647. These freestanding walls are used for fences and sound abatement walls. The aforementioned walls do an excellent job of lowering sound levels behind and adjacent to the walls. These walls also create private spaces that are visually pleasing. Unfortunately, these walls cannot be used as a structural component for man made structures. These walls can only hold up their own weight and the vegetation encased in these walls.

One way to accomplish the goal of incorporating more vegetation in an urban setting is to attach vegetation directly to a freestanding structure. The oldest means of accomplishing this is to plant climbing vines at the base of a building and nurturing their growth. This method also creates an aesthetically pleasing environment, but there are some problems with this method. It takes decades for a structure to be enveloped by vegetation. This method is also limited because only a small number of species of vegetation are suitable for use with this method. Another way to accomplish this objective is to attach a system of planters to the face of a structure. The irrigation and drainage needs of this type of system are accommodated with a plumbing system. An example of this method can be seen in U.S. Pat. No. 4,295,296. The disadvantage of this method is that the vegetation is isolated and cannot form an integrated ecosystem. Another method is to attach a system of soil filled bags to the wall of a structure. Vegetation is either planted between the bags of soil or an access slot is cut into the bag to allow the vegetation to be planted inside the bag. This system can be permanently attached to a wall or hung from a wall with a system that allows it to be detached from wall. U.S. Pat. Nos. 5,579,603 and 5,257,476 are examples of this method. One disadvantage of this method is a limited number of species of vegetation can be used. Another limitation of this system is that it cannot be used as a load-bearing component of a structure. This system would also be more expensive to build than a system that incorporates vegetation as it is built because this system would be an additional step in the building process of a structure.

All the earlier mentioned strategies for incorporating more vegetation into a man made structure lack a structural load bearing capacity. The following six patents: U.S. Pat. Nos. 5,836,126; 5,806,264; 5,216,863; 3,722,169; 3,631,647 and 3,466,823 are all capable of performing the load bearing needs for a structure. These patents use different means to achieve load bearing capability. U.S. Pat. Nos. 5,836,126 and 5,216,863 construct load bearing walls by using molds to form concrete and reinforcing steel. U.S. Pat. No. 5,806,264 use a system of hollow bricks that when stacked can be filled with reinforcing steel and concrete to form a load bearing wall. U.S. Pat. No. 3,722,169 installs vertical piers that are used as guides for the horizontal components of a structure and together the vertical piers and horizontal components combine to form a load bearing structure. U.S. Pat. No. 3,631,647 achieve load bearing capacity by assembling manufacture steel components to form a load bearing wall. U.S. Pat. No. 3,466,823 use manufactured components that can be assembled to form a variety of structures. All five of the previously mentioned patents can be used for a load bearing component of structure but none have a capacity to incorporate vegetation into a structure.

OBJECTS AND ADVANTAGES (a) to provide a freestanding wall that can be used in a load bearing and shear capacity for any structure that incorporate this invention (b) to provide attachment points for ease of assembly and construction of flooring and mechanical systems;

(c) to be able to build inexpensively by having the components needed to build said wall manufactured for ease of assembly.

(d) to be able to meet the various construction needs of building with this system by having both a steel or steel like assembly method and a concrete or concrete like material assembly method;

(e) to incorporate more vegetation into urban settings by building structures that provide for the needs of vegetation;

(f) to maintain the health of an ecosystem created on a Vertical Ecosystem Structure, electronic sensors can be installed to monitor the health of each plant;

(g) to provide micro-care of vegetation by allowing access to the roots of the vegetation used in a completed structure that use this invention;

(h) to create micro-climates by manipulating the directional orientation to the sun and/or enclosing this invention behind a glass curtain wall;

(i) to lower carbon dioxide levels in urban settings by having more vegetation in urban settings to convert carbon dioxide into oxygen;

(j) to have vegetation in urban settings filter air pollutants by providing various species of vegetation; this allows less polluted air available to urban inhabitants to breath;

(k) to lower ambient noise in an urban setting by trapping noise waves into the vegetation of a structure that incorporate this invention;

(l) to mediate temperature fluctuations by incorporating more vegetation into urban settings because vegetation has the ability to absorb and radiate heat (m) to conserve water, this invention can use gray water to irrigate vegetation and septic tanks with leaching fields installed in the soil of the Vertical Ecosystem Structure can also fertilize the vegetation'

(n) to generate electricity for a structure by using solar panels as louvers for structures that enclose a V.E.S. behind a glass curtain wall to create a micro-climate;

(o) this invention can conserve water because being on the vertical plane, a large number of vegetation use the same amount of water that one plant would need on the horizontal plane for irrigation;

(p) to accommodate a large variety of vegetation and to control the growth of vegetation the retaining walls and structure that hold the retaining walls can expand or retract in relation to the main structural wall to vary the amount of soil to meet the needs of most types of vegetation;

(q) this invention can be cultivated with ornamental vegetation and/or crops providing foodstuffs, medicine and fibers for human consumption;

(r) to help insulate a structure build with a V.E.S. the soil can be used for its insulating capability;

(s) the retaining walls of this invention can be made from a variety of materials and shapes to give this invention a sculptural quality;

(t) the retaining walls of this invention will contain attachment points where vegetation can be attached to a structure to prevent the vegetation from tumbling down the face of a structure that utilize this invention;

(u) to create one ecosystem instead of isolated plants in planters this invention has one strata of soil that run from top to bottom;'

(v) to maintain the vegetation on a structure that utilize this invention there is a system similar to what high rise window washers use for vertical gardeners to maintain the vegetation of a structure that uses this invention;

(w) to help fertilize a structure using a V.E.S. chambers can be built into the structure that can compost the vegetation refuse from a structure that uses this invention;

(x) to build a structure that changes appearances monthly because it was cultivated with a variety of vegetation that flower with color at different times of the year;

(y) to urban inhabitants this invention has the mental health advantage of giving them the natural and serene environment of a rural landscape in an urban setting; and (z) this invention also has a recreational capacity by incorporating hand holds and safety mechanisms for urban rock climbers to practice their sport.

Further objects and advantages are to provide a more nature filled environment for urban inhabitants to dwell in. Still further, objects and advantages will become apparent from a consideration of the ensuing description and drawings.

BRIEF DESCRIPTION OF DRAWINGS

These and other aspects, objects, features, and advantages of the present invention will be more clearly understood and appreciated from a review of the following detailed description of the preferred embodiments and appended claims, and by reference to the accompanying drawings, in which:

FIG. 1. is a perspective view of a wall that is a freestanding ecosystem that can be utilized as a load bearing and shear wall component for any structure that utilize this invention according to the embodiments of the present invention;

FIG. 2 is perspective view of the invention as it would be constructed by rigid components that are fastened together;

FIG. 3 is a perspective view identifying the major components of the invention as it would be constructed by using the rigid component method;

FIG. 4 is a perspective view of the invention as it would be built using a construction method that use a substance that converts from liquid to solid;

FIG. 5 is a perspective view identifying the major components of the invention as it would be built using a construction method that uses a substance that converts from liquid to solid;

FIG. 6 is a perspective view the retaining and portal between front and back of a wall built with either rigid components or poured wall;

FIG. 7 is a perspective view identifying the major components retaining and portal between sides of wall structure.

FIGS. 8A and 8B are perspective view of both the main construction types used in this invention.

FIGS. 9A, 9B, 9C, and 9D are perspective view of one individual cell that combined with other cells comprises a finished wall.

REFERENCE NUMBERS IN DRAWINGS

10 vertical structural component
11 rigid component fastener
12 portal shear component
14 horizontal structural component 15 spacer
16 diagonal reinforcement
17 vertical reinforcement
18 end cap mold component
19 portal fastener component
20 wall mold
21 mold fastener
22 alignment bushing
23 end hoop support
24 hoop support
25 coupling
26 brace retaining system
27 retaining wall
28 brace
29 support retaining wall bracket
30 retaining wall bracket
31 reinforcement fastener
32 steel assembly
33 reinforced concrete assembly
34 retaining assembly

SUMMARY

In accordance with the present invention, a construction method to build a freestanding structural wall that incorporates vegetation as an integral component has said wall to form a freestanding ecosystem. This invention can be used in new and remodel construction as an integral structural component.

DETAILED DESCRIPTION—FIGS. 1 TO 9

There follows a description of the preferred embodiments of the invention by reference to the accompanying drawings. Referring now to FIG. 1 there is a perspective view of the wall structure of the present invention as it would be seen after it was built and vegetation had integrated itself with the wall.

This patent's method of construction for the main structural component can be built using two types of materials. This method can be built with either rigid steel components or molded from concrete with reinforcement steel embedded in the concrete. Concrete can either be poured on site or components manufactured elsewhere and assembled on site. Every finished structural wall using this method of construction is comprised of a grid on its face. Each grid forms one cell and every cell has an identical structure to all cells that comprise a structure using this method of construction. Each cell has one or more passages between sides of a structural wall that use this method of construction. The passages between faces of a wall using this method of construction are attachment and access points.

Referring now to FIG. 2 is a perspective view of this building method when it is constructed from steel. Referring now to FIG. 3 is a perspective view of the invention as it would be constructed using steel exclusively, and its parts identified. Vertical structural component 10 and horizontal structural component 14 are made from steel I-beams. All the dimensions of the I-beam components manufactured for a particular structure using this patents method of construction will vary with the structural needs of the structure that incorporates this method of construction in its design. A one story structure with a small load would have I-beams with flanges of a few inches and the steel might be a $\frac{1}{8}^{th}$ inch thick. A high-rise building would have I-beam components with flanges in the tens of inches and the thickness of the steel could be an inch and up depending on the structural needs of a structure incorporating this construction method. Vertical structural component 10 and horizontal structural component 14 are manufactured with holes to fasten or align to each other and other components of a structure using this method of construction. A vertical structural component 10 is attached to horizontal structural component 14 with rigid component fasteners 11 or welded at a perpendicular angle to each other as viewed in a frontal elevation view. Rigid component fastener 11 is a bolt and nut of predetermined size to attach the components of a structure using this method of construction. Every wall using this method is made up of a series of cells of uniform dimensions, and each cell is comprised of two vertical components 10, two horizontal components 14, and one portal shear component 12. The five components of each cell are attached to each other by a series of aligned holes with fastener 11 or welds attaching the components together. The size of each cell can vary greatly in height width and thickness depending on the structural, aesthetic flora and fauna needs of a structure that incorporates this invention in its design. Cell size can range from a few inches to multiple feet, and the thickness of portal shear component 12 can vary from $\frac{1}{8}^{th}$ inch to an inch plus. Every wall constructed with this method is comprised of a number of cells that share adjacent vertical components 10 and adjacent horizontal components 14 to form a finished wall. Portal shear component 12 is the central component for each cell in a finished wall using this method of construction. Portal shear component 12 is comprised of a flat piece of rigid material with holes around the perimeter to facilitate attaching it to vertical components 10 and horizontal components 14. A portal shear component 12 has a centrally located passage between the faces and/or numerous other passages depending on the needs of the structure using this construction method. The passage or passages in the central area of a portal shear component 12 have attachment points to attach numerous brackets, portals and devices that function between faces of a wall using this construction method. A wall built using this construction method would first have at least two vertical structural components 10 protruding and secured to the earth. Horizontal structural component 14 would be secured between vertical structural components 10 at predetermined distances with rigid component fastener 11 or welded. Portal shear component 12 would be attached between two vertical structural components 10 and two horizontal structural component 14 with rigid component fasteners or welded, and this comprises a cell. A wall using this construction method would be comprised of many cells and their number in a wall would depend on the size of the wall and the size of each cell in that wall.

Referring now to FIG. 4 is a perspective view of this building method when it is constructed from concrete. Referring now to FIG. 5 is a perspective of the invention as it would be constructed using concrete with its parts identified. Spacer 15 is a bar shaped component made from wood or plastic with holes along its length. The length of spacer 15 depends on the size of each cell used in a structure using this construction method, and the thickness and width range from two to four inches depending on the structure using this construction method. Diagonal reinforcement 16 is comprised of multiple reinforcement steel parts that are welded to metal brackets on its ends and a steel tube in its center, and can be reversed to form an x shaped structure when used in conjunction with another diagonal reinforcement 16. Vertical reinforcement 17 is made from multiple reinforcement steel components with welded brackets that incorporate attachment points on each end of it. End cap mold component 18 is u shaped looking at it from above. And it is the same length as spacer 15, and has flanges with holes that correspond with the holes in spacer 15. End cap mold component 18 is made from plastic or possibly wood, and the thickness of the end cap mold component 18 can vary from a ¼ inch to an inch. Portal fastener component 19 is a cylinder with smaller threaded rods protruding from each end, and is made from plastic or wood. The dimensions of Portal fastener component 19 can vary depending on the needs of a structure that incorporates this method of construction, and there size could range from one inch to one foot in diameter and there length could range from a few to tens of inches in length. Wall mold 20 is a flat piece of plastic or wood with a flange with attachment points on the flange surrounding it. Wall mold 20 has a hole in its center, and its diameter corresponds with the diameter of the rods protruding from Portal fastener component 19 with a diameter of ¼ inch to 1 inch. Mold fastener 21 is a steel bolt with a quick release mechanism of a diameter of ¼" to ½", and variable length depending on distance needed to span. Alignment bushing 22 is a section of pipe that can be made from steel or plastic, and its dimensions can vary depending on needs of structure that incorporate this construction method. End hoop support 23 are made from sections of reinforcement steel with attachment brackets welded to its ends, and its dimensions can vary with the structural needs of a structure that incorporates this construction method. Hoop support 24 is made from sections of reinforcement steel with attachment brackets welded to its ends, and its dimensions can vary with the structural needs of a structure that incorporates this construction method. The top and bottom of vertical reinforcement 17 is attached to a diagonal reinforcement 16 with rigid component fastener 11 or welded together. Two diagonal reinforcement 16 when reversed and joined in the center by alignment bushing 22 they form one x shaped structure. Each leg of the x formed by combining two reversed diagonal components 16 are attached to the top and bottom of vertical reinforcement 17. End hoop support 23 and hoop support 24 attach to vertical reinforcement 17 with a saddle that fits around the vertical rods that are part of vertical reinforcement 17 and this forms the basic reinforcement steel in one cell in a reinforced concrete structure using this invention. Wall mold 20 is attached to the basic reinforcement steel in one cell by portal fastener 19 and portal fastener is fitted in alignment bushing 22. Wall molds 20 are attached to adjacent molds 20 by spacers 15 and these are connected by mold fasteners 21. To complete a form to pour a reinforced concrete wall end cap molds 18 are attached to wall molds 20 on each side of wall. Mold fasteners 21. To build a wall using concrete an initial cell of reinforced steel is constructed. Two diagonal reinforcements are reversed to form an x shape. The x shape is kept in alignment by placing alignment bushing 22 into the cylinders welded into the center of each diagonal reinforcement 16. Vertical reinforcement 17 attaches between the arms of diagonal reinforcement 16, and this forms the basic reinforced steel structure. Portal fastener component 19 fits into alignment bushing 22. A wall mold 20 attaches to each end of portal fastener component 19, and on either side of wall mold 20 is either spacer 15 or end cap mold component 18 depending on the design of the wall being built. After one level of cells have had there reinforcement steel assembled end been encased with a mold then concrete can be poured. A structure can either have a concrete wall poured at a construction site or components manufactured elsewhere and assembled on site.

Referring now to FIG. 6 is a perspective view of retaining assembly 34. Referring now to FIG. 7 is a perspective view of the retaining assembly of this invention. The retaining and portal system for this invention is interchangeable for both the steel method of building this invention and the reinforced concrete method. In both the steel and reinforced concrete method of building this invention there is an array of passages between both sides of wall with a passage in each cell of a completed structure. Coupling 25 consists of a ⅛" to ¼" inch metal plate with a hole in the middle and a piece of pipe attached over the hole in the plate. The length of pipe on coupling 25 varies with application, and there are attachment points on the corners of the plate. Brace retaining system 26 consists of a metal plate that is in the shape of an H, and have attachment points on the legs of the H. The dimensions of the brace retaining system varies with the structural needs of a structure that us this construction method. Retaining wall 27 can be made in an almost infinite amount of shapes and materials with attachment points placed in critical locations depending on the needs of the structure utilizing this construction method. Brace 28 is a metal part shaped like an H with a bolt attached to its center, and its dimensions vary with the structural needs of a structure that utilize this construction method. Support retaining wall bracket 29 consists of a metal plat with a metal tube attached to its center and holes in the corners of the plate. Bracket 29 also has two metal plates attached at perpendicular angles with attachment points that telescope out of the metal pipe. Retaining wall brackets 30 are two flat stock metal bars with a middle hinged point and attachment points along its length. The dimensions of bracket 30 vary with the needs of the retaining walls attached to it. Reinforcement fasteners 31 are steel bolts that attach Bracket 30 to retaining wall 27. When attaching the retaining and portal system to a wall constructed by the reinforced concrete method portal fastener component 19 is retained in wall after wall molds 20 are detached from it. Brace 23 or brace retaining system 25 are attached to portal fastener component 19 depending on the application of either a retaining structure or a portal point for the maintenance systems for a completed wall. On a retaining structure attachment point portal fastener component 19 has brace 23 attached on the opposite side that retaining walls 26 will be attached to the wall and brace retaining system 25 is attached to portal fastener component 19 on the same side as the retaining wall 26. Support retaining wall bracket 27 is bolted to brace retaining system 25 in the concrete version of this invention and bolted to portal shear component 12 in the steel version of this invention. Retaining wall bracket 28 is attached to the wall by support retaining wall bracket 27 and retaining wall 26 is supported by retaining wall bracket 27. Retaining system parts: 23, 24, 25, 27, and 28 are made of steel, but retaining wall 26 can be made from a wide assortment of materials and made to order in a wide range of shapes.

Referring now to FIG. 8 is a perspective view that show both construction methods side by side to show how they are similar other than using two construction methods. Steel assembly 32 is the invention as it would be seen with assembled rigid components. Reinforced concrete assembly 33 as it would be seen in preparation to pouring concrete with reinforcement steel in place.

Referring now to FIG. 9 is a perspective showing an individual cell in steel and concrete, with portal and attachment mechanism.

OPERATION—FIGS. 1 TO 9

The manner of building a freestanding load bearing structure with this invention's method of construction is similar to conventional construction methods using either solid steel construction or reinforced concrete. The difference of this invention's method of construction is the mechanisms built into a structure using this method of construction that allow said structure to sustain an ecosystem on a vertical plane. Initially a freestanding wall is constructed using either steel assembly 32 or a reinforced concrete assembly 33 as seen in FIG. 8.

Referring to FIG. 3 is a perspective view of this invention as it would be constructed using solid steel components with its parts identified. In a completed structure using this method of construction vertical structural component 10 carries the vertical loads of a structure using this method of construction. Horizontal structural component 14 are attached with rigid component fasteners 11 or welded at equilateral points up a vertical structural component 10 and their function is to transfer the loads of the structure using this method of construction to a vertical structural component 10. The increments that horizontal structural components 14 are attached to up a vertical structural component 10 depend on the size of the cells that comprise a wall using this method of construction. A structure that use this method of construction can build an entire structure around a wall built with this method of construction can have the rest of a structure attached directly to vertical structural component 10. Portal shear component 12 are attached to vertical structural component 10 and horizontal structural component 14 with rigid component fastener 11 or welded. Portal shear component 12 has numerous functions: it prevents a structure from collapsing from the horizontal loads of seismic and winds forces, it allows access between the sides of a wall by incorporating passages in a wall using this method of construction.

Referring to FIG. 5 is a perspective view of this invention as it would be constructed using reinforced concrete with its parts identified. In a completed structure using this method of construction vertical reinforcement 17 reinforces the vertical loads on a reinforced concrete structure, and is attached to diagonal reinforcement 16 with rigid component fastener 11 or welded together. Diagonal reinforcement 16 has two main functions: it provides horizontal reinforcement to sustain the structure against the horizontal forces of wind and seismic forces, it also provides for the creation of passages between the faces of a wall constructed using this method of construction. Alignment bushing 22 join multiple diagonal reinforcement 16 in the center as they form an x when connected by alignment bushing 22. Portal fastener component 19 fit into alignment bushing 22 and secure wall mold 20 with a threaded bolt protruding through wall mold 20, it also holds wall molds 20 away from vertical reinforcement 17 and diagonal reinforcement 16 to form a layer of concrete between reinforcements 17 and 16. Hoop support 24 and end support 23 have saddles on each end that weld to vertical reinforcement 17, and prevent reinforcements 17 and 16 from buckling. Wall molds 20 attaches to spacer 15 and end cap mold component 18 with mold fasteners 21 to form a receptacle around steel reinforcements 17 and 16 to form a mold to pour concrete into. When wall mold 20 is fastened to spacer 15 and end cap mold component 18 the tops of this structure are staggered in height to help align the next level, of molds to pour their next level of concrete.

The passages that are incorporated in a portal shear component 12 have numerous functions. They are attachment points that allow a structure that is built around a wall using this method of construction to carry the structural forces for said structure. They also can secure the various systems needed for the structure that incorporate this method of construction with support retaining wall bracket 29 that are modified for a particular task at hand. The following systems can be attached to a structure built with this method of construction: plumbing, electrical, elevators, structural loads of adjacent structure, heating and cooling ducting, telecommunications, and any system that needs to run from the bottom to the top of a structure and vice versa. The passages in portal shear component 12 also allow for the micro management of the vegetation incorporated into a structure that utilizes this construction method; coupling 25 allow the following systems access between inner wall and vegetation encased outer wall. An irrigation system allows the vegetation in a structure incorporating this construction method to be properly irrigated at the root level. A gray water system can be incorporated to use some of the waste water of a structure that incorporates this construction method for irrigation. Coupling 25 can also be used for the drainage of excess water in a wall that uses this construction method. Fertilizer can be piped to any point on a wall that uses this method of construction, and septic leach fields can also be incorporated to fertilize the vegetation and lower the amount of sewage that a structure not using this method of construction would normally produce. Sensors can also by routed through couplings 25 to each plant in a wall using this method of construction to monitor the health of the wall as a whole and each individual plant in said wall. Every system aforementioned can by built modules to lower costs or custom built to serve the individual needs of the vegetation used in a structure that incorporate this construction method. The passages in a portal shear component 12 also allow support retaining wall bracket 29 to attach to the outer walls of a structure that uses this construction method. On support retaining wall bracket 29 there are attachment points before the junction that attach support retaining wall brackets 29 to retaining wall bracket 30. The attachment points on support retaining wall bracket 30 have numerous functions: they allow cables to be strung between support retaining wall brackets 29 for the structural integrity of a structure that incorporates this construction method. They also allow netting and root ball restraints to be attached to the structure to hold the vegetation to be secured to the structure that incorporates this construction method. Retaining wall bracket 30 also has attachment points that have the same functions aforementioned plus they secure the retaining wall 27 at an inclination dictated by the design of the structure that use this construction method. The attachment points on support retaining wall bracket 29 retaining wall bracket 30 and attachment points built into retaining wall 27 can secure vegetation to the wall using this construction method as it grows.

Referring to FIG. 1 shows this invention as it would appear after vegetation has been given a chance to incorporate itself into the structure. The look of a structure using this construction method would be the same regardless if it was built with a solid steel assembly or reinforced concrete assembly. One of the embodiments of a structure that incorporates this method of construction is the ability of a finished structure to form micro-climates. By specifying particular vegetation a structure using this construction method micro-climates can be formed. Another method to create micro-climates would be the orientation of a structure built with this method to the sun. An example would be vegetation that would normally not grow in a desert environment would be able to live on a wall that is oriented more to the east were it would avoid the harsher afternoon sun of a dessert environment. Another microclimate could be created by enclosing a structure using this construction method behind a glass curtain wall, and solar panels could be used as the louvers in front of the glass curtain wall to regulate the temperature inside the glass enclosure and supply electricity for the structure.

CONCLUSION, RAMIFICATIONS, AND SCOPE OF INVENTION

Thus the reader will see that the construction method of this invention allows structures to be assembled quickly and inexpensively with its modular design. Also this invention's method of construction allows vegetation to be integrated into a structure that incorporates it as an integral part of that structure.

This invention can be used as the main structural component for new or remodel construction and can also be a stand alone structure.

This invention can by built with rigid components that connect to each other.

This invention can be constructed as a fluid material that cures to a hardened state with rigid reinforcement.

Both the aforementioned assembly methods are comprised of modular construction for swift and economical construction.

A network of passages between faces of a completed wall using this construction method has numerous foreseen and unforeseen uses.

Attachment brackets secured at the passages and super structure of a wall constructed using this method of construction can secure a structure built around it.

Brackets secured at the passages facing the inside of a wall constructed using this method of construction can secure multiple systems needed to sustain a building. Examples; electrical, telecommunications, plumbing, elevator, ventilation, and any other system that a structure would need to sustain itself.

The network of passages between faces of a wall using this construction method gives vegetation a place to grow on the outside face of a structure using this invention. The passages secure brackets that hold retaining walls that hold a layer of soil to a wall using this construction method.

The passages between faces of a wall using this construction method allows the vegetation planted on said wall to be nurtured by allowing the following systems to maintain the vegetation. The passages allow for each plant on said wall to be properly irrigated and also allow for drainage. Fertilizers can be introduced at the root level to the vegetation of this system, and each piece of vegetation can be monitored for optimum health.

This structure conserves water by the following methods. The vegetation secured to a structure using this method of construction is on the vertical plane and this allows more vegetation to irrigate by the same amount of water as it flows from top to bottom. A structure that incorporates this method of construction can pipe the gray water produced in said structure to the vegetation of wall to irrigate it.

The vegetation incorporated in a structure using this construction method has a number of benefits. The vegetation can filter pollutant's in the atmosphere. The vegetation can also create oxygen and help eliminate global warning.

This invention can also lower the amount of sewage produced by a structure by having septic leach fields in the strata of soil on the outside of a structure that incorporate this construction method in its design.

Using this invention for new and remodel construction can lower the loss of arable land due to urban sprawl.

Although the description above contains much specificity, these should not be construed as limiting the scope of the invention but as merely providing illustrations of some of the presently preferred embodiments of this invention. For example, this invention can be used as stand alone farms and special apparatus can be used on runners on the side of said wall to harvest these walls.

Thus the scope of the invention should be determined by the appended claims and their legal equivalents, rather than by the examples given.

I claim:

1. A method to build a freestanding load bearing shear wall that incorporates a means to sustain an ecosystem as an integrated component of said shear wall: (a) the main structural component of said shear wall is constructed with a multitude of openings between the front and back faces of the wall; (b) placed through the openings in said shear wall are assemblage means that secure to the back face of said shear wall and project outward from the front face of said shear wall; (c) at the ends of said assemblage means protruding from the front face of said shear wall is a means to secure rigid sheets of material to said shear wall; (d) said rigid sheets form retaining walls and are attached to the assemblage means in a way that produces a space between the main structural component and said retaining walls; (e) edges of said rigid sheets do not come in direct contact with the said main structural component and are attached so that the bottoms of said rigid sheets are closer to said main structural component then the tops of said rigid sheets; (f) said retaining walls are secured to said main structural component with an unbroken surface on the vertical plane while providing open terraces on the horizontal plane; (g) a medium is provided in said shear wall to plant said shear wall with vegetation; (h) after all said retaining walls are in place the space created between said retaining walls and said main structural component filled with a growing medium for vegetation; (i) after said growing medium is inserted a stratum of growing medium is created from the base to top of said shear wall forming a freestanding ecosystem.

2. A method to build a freestanding load bearing shear wall according to claim 1, wherein the main structural component of the shear wall is built out of a series of steel components that can either be bolted or welded together.

3. A method to build a freestanding load bearing shear wall according to claim 1, wherein the main structural component of the shear wall is built using a series of rebar cages that are secured to each other and then enclosed in a mold before concrete is poured to create said shear wall.

4. A method to build a freestanding load bearing shear wall according to claim 1, wherein said rigid sheets forming said retaining walls are made in almost any shape and out of almost any material as long as said material and shape can withstand the pressures of the material that it is holding against the main structural component.

5. A method to build a freestanding load bearing shear wall according to claim 1, wherein vegetation is planted in said growing medium in the terraced horizontal openings and a means is provided to secure roots of said vegetation to the assemblage means.

6. A method to build a freestanding load bearing shear wall according to claim 1, wherein the openings between the faces of the said shear wall provide: (a) a means to irrigate the vegetation attached to said shear wall; (b) a means to drain excess fluids from said shear wall; (c) a means to fertilize the vegetation attached to said shear wall; (d) a means to monitor the health of the vegetation attached to said shear wall.

7. A method to build a freestanding load bearing shear wall according to claim 1, wherein a number of means are provided to control the growth of the vegetation attached to said shear wall: (a) sizing said retaining walls to restrict root balls of said vegetation to control the eventual size of any given piece of said vegetation growing on said shear wall; (b) constructing said shear wall in varying directional orientations to control the amount of sunlight said shear wall receives; (c) creating a greenhouse atmosphere by sealing said shear wall behind a glass curtain wall.

8. A method to build a freestanding load bearing shear wall according to claim 1, wherein said shear wall can be utilized as a recreational device for rock climbers: (a) by countering the retaining walls to incorporate handholds for climbers to pull themselves up said shear wall; (b) by incorporating attachment points in the faces of said retaining walls to allow climbers to attach safety lines to said shear wall.

9. A method to build a freestanding load bearing shear wall according to claim 1, wherein said shear wall has a sculptured quality that provides a designer a large visual pallet to create a structure to satisfy a creative imagination: (a) said retaining walls are placed at various locations on said shear wall to achieve a certain look that a designer cares to create; (b) said retaining walls are made out of a large variety of materials and colors to fulfill a creative vision of the structure.

10. A method to build a freestanding load bearing shear wall according to claim 1, wherein said shear wall has a variable look from season to season and year to year: (a) as said vegetation growing on said shear wall is replaced by new vegetation the look of said shear wall changes; (b) the look of said shear wall changes from season to season by the use of deciduas vegetation and/or evergreen vegetation; (c) the color scheme of said structure changes by using a vegetation that blooms in different colors and different times of the year.

* * * * *